United States Patent
Gu et al.

(10) Patent No.: US 9,576,072 B2
(45) Date of Patent: Feb. 21, 2017

(54) DATABASE CALCULATION USING PARALLEL-COMPUTATION IN A DIRECTED ACYCLIC GRAPH

(71) Applicants: Jing Gu, Shanghai (CN); Jie Zhao, Shanghai (CN); Xiangling Shi, Shanghai (CN); Chengchang Wang, Shanghai (CN); Yi Ru, Shanghai (CN); Gan Li, Shanghai (CN); Jiale Qu, Shanghai (CN); Xu Li, Shanghai (CN); Zhonglei Zou, Shanghai (CN)

(72) Inventors: Jing Gu, Shanghai (CN); Jie Zhao, Shanghai (CN); Xiangling Shi, Shanghai (CN); Chengchang Wang, Shanghai (CN); Yi Ru, Shanghai (CN); Gan Li, Shanghai (CN); Jiale Qu, Shanghai (CN); Xu Li, Shanghai (CN); Zhonglei Zou, Shanghai (CN)

(73) Assignee: SAP SE, Walldorf (DE)

( * ) Notice: Subject to any disclaimer, the term of this patent is extended or adjusted under 35 U.S.C. 154(b) by 358 days.

(21) Appl. No.: 14/347,241

(22) PCT Filed: Feb. 13, 2014

(86) PCT No.: PCT/CN2014/072051
§ 371 (c)(1),
(2) Date: Mar. 26, 2014

(87) PCT Pub. No.: WO2015/120603
PCT Pub. Date: Aug. 20, 2015

(65) Prior Publication Data
US 2015/0234935 A1  Aug. 20, 2015

(51) Int. Cl.
*G06F 17/30* (2006.01)

(52) U.S. Cl.
CPC ... *G06F 17/30958* (2013.01); *G06F 17/30224* (2013.01); *G06F 17/30294* (2013.01)

(58) Field of Classification Search
CPC ............... G06F 17/30958; G06F 17/30224; G06F 17/30294
See application file for complete search history.

(56) References Cited

U.S. PATENT DOCUMENTS

| 5,546,564 | A | 8/1996 | Horie |
| 5,574,900 | A | 11/1996 | Huang et al. |
| 6,282,708 | B1 * | 8/2001 | Augusteijn ............ G06F 8/433 712/216 |
| 6,308,166 | B1 | 10/2001 | Breuker et al. |
| 6,499,023 | B1 * | 12/2002 | Dong .................... G06Q 30/02 706/46 |

(Continued)

FOREIGN PATENT DOCUMENTS

| CN | 102207883 | 10/2011 |
| CN | 103077006 | 5/2013 |

*Primary Examiner* — Apu Mofiz
*Assistant Examiner* — Jared Bibbee
(74) *Attorney, Agent, or Firm* — Horizon IP Pte. Ltd.

(57) ABSTRACT

Disclosed herein are technologies related to database calculation that utilizes parallel-computation of tasks in a directed acyclic graph. In accordance with one aspect, dependency of tasks is converted into a directed acyclic graph that topologically orders the tasks into layers of tasks. A database calculation may be performed, wherein the database calculation computes in parallel the tasks in each layer of the layers of tasks.

20 Claims, 8 Drawing Sheets

(56) References Cited

U.S. PATENT DOCUMENTS

| | | | |
|---|---|---|---|
| 7,324,936 B2 | 1/2008 | Saldanha et al. | |
| 7,370,325 B1* | 5/2008 | Hull | G06F 9/4843 |
| | | | 718/102 |
| 7,702,482 B2 | 4/2010 | Graepel et al. | |
| 7,945,489 B2 | 5/2011 | Weiss et al. | |
| 8,099,383 B2 | 1/2012 | Naibo et al. | |
| 8,126,870 B2 | 2/2012 | Chowdhuri et al. | |
| 8,185,908 B2 | 5/2012 | Taniguchi et al. | |
| 8,280,915 B2 | 10/2012 | Jagannath et al. | |
| 8,347,250 B2 | 1/2013 | Gonzalez et al. | |
| 8,359,292 B2 | 1/2013 | Morrison et al. | |
| 8,417,732 B2 | 4/2013 | Rapp | |
| 8,504,791 B2 | 8/2013 | Cheriton et al. | |
| 8,626,740 B1 | 1/2014 | Harinarayan et al. | |
| 8,631,416 B2 | 1/2014 | Rodriguez | |
| 2002/0069103 A1 | 6/2002 | Puri et al. | |
| 2003/0115545 A1* | 6/2003 | Hull | G06F 8/31 |
| | | | 715/205 |
| 2005/0120010 A1 | 6/2005 | Philpott et al. | |
| 2008/0120129 A1 | 5/2008 | Seubert et al. | |
| 2009/0254774 A1 | 10/2009 | Chamdani et al. | |
| 2012/0109934 A1 | 5/2012 | Weyerhaeuser et al. | |
| 2012/0323971 A1 | 12/2012 | Pasupuleti | |
| 2012/0324472 A1* | 12/2012 | Rossbach | G06F 9/467 |
| | | | 718/106 |
| 2013/0024645 A1 | 1/2013 | Cheriton et al. | |
| 2013/0046743 A1 | 2/2013 | Gruschko et al. | |
| 2013/0086495 A1 | 4/2013 | Guzansky et al. | |
| 2013/0152057 A1* | 6/2013 | Ke | G06F 8/453 |
| | | | 717/132 |
| 2013/0159285 A1 | 6/2013 | Dees et al. | |
| 2013/0226318 A1 | 8/2013 | Procyk et al. | |
| 2013/0290293 A1 | 10/2013 | Weyerhaeuser et al. | |
| 2013/0290298 A1 | 10/2013 | Weyerhaeuser et al. | |
| 2013/0298130 A1* | 11/2013 | Pienaar | G06F 9/4887 |
| | | | 718/102 |
| 2014/0013318 A1* | 1/2014 | Rychikhin | G06F 8/65 |
| | | | 717/172 |
| 2014/0282572 A1* | 9/2014 | Kang | G06F 9/4881 |
| | | | 718/103 |
| 2014/0359563 A1* | 12/2014 | Xie | G06F 8/34 |
| | | | 717/106 |
| 2015/0067088 A1* | 3/2015 | Guerin | G06F 15/167 |
| | | | 709/213 |

\* cited by examiner

Fig. 1

| Costing sheet rows | | | | |
|---|---|---|---|---|
| Row | Base | Overhe... | Description — 208 | From To Row — 210, 212 |
| 10 | B000 — 204-2 | | Material | |
| 20 | | 206-2 — C000 | Material OH | 10 — 202-2 |
| 30 | | | Material usage...... | |
| 40 | B001 — 204-4 | | Wages | |
| 45 | B002 — 204-6 | | Salaries | |
| 50 | | 206-4 — C001 | Manufacturing OH | 10 — 202-2 |
| 60 | | 206-6 — C021 | Manuf.OH/plant | 10 — 202-2 |
| 70 | | 206-8 — C021 | Manuf.OH/plant | 10 — 202-2 |
| 80 | | 206-10 — C002 | Administration OH | |
| 90 | | 206-12 — C003 | Sales OH | 70 — 202-16 |
| 100 | | | Cost of goods sold... | |

|  | P1R1 302 | P1R2 304 | P1R3 306 | P1R4 308 | P1R5 310 | P2R1 312 | P2R2 314 | P2R3 316 | P2R4 318 | P2R5 320 |
|---|---|---|---|---|---|---|---|---|---|---|
| P1R1 302 |  |  |  |  |  |  |  |  |  |  |
| P1R2 304 |  | 1 (321) | 1 (322) |  |  |  |  |  |  |  |
| P1R3 306 |  |  | 1 (324) |  |  |  |  |  |  |  |
| P1R4 308 |  |  |  |  |  |  |  |  |  |  |
| P1R5 310 | 1 (326) | 1 (328) | 1 (330) | 1 (332) |  |  |  |  |  |  |
| P2R1 312 |  |  |  |  |  | 1 (334) | 1 (336) | 1 (338) |  |  |
| P2R2 314 |  |  |  |  |  |  |  |  |  |  |
| P2R3 316 |  |  |  |  |  |  |  |  |  |  |
| P2R4 318 |  |  |  |  |  |  |  |  |  |  |
| P2R5 320 |  |  |  |  |  | 1 (340) | 1 (342) | 1 (344) | 1 (346) |  |

DATABASE CALCULATION USING PARALLEL-COMPUTATION IN A DIRECTED ACYCLIC GRAPH

TECHNICAL FIELD

The present disclosure relates generally to a database calculation that utilizes parallel-computation of tasks in a directed acyclic graph.

BACKGROUND

In an enterprise or business system, an inventory management performed by a computerized inventory management system includes receiving of inventories such as raw materials, shipping orders, overhead costs, etc. These inventories may be in volumes and data relations between the raw materials, shipping orders, etc. may complicate a computation of even the simplest item that may be searched from the database.

For example, in manufacturing enterprises, there is a need to calculate production cost of their finished and semi-finished goods. Direct costs like raw materials and direct labors may be easily measured, because they are straightly posted to production orders. However, indirect overhead costs, such as storage cost, utility cost and administration cost, have to be calculated based on other factors such as, a percentage of the raw materials, a percentage of direct labor amounts, etc.

SUMMARY

Disclosed herein are technologies related to database calculation that utilizes parallel-computation of tasks in a directed acyclic graph. In accordance with one aspect, dependency of tasks is converted into a directed acyclic graph that topologically orders the tasks into layers of tasks. A database calculation may be performed to compute in parallel the tasks in each layer of the layers of tasks.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are technologies for a database calculation that utilizes parallel-computation of tasks in a directed acyclic graph. For example, a dependency of tasks in a particular datasheet is first identified. In this example, the identified dependency of tasks is converted or represented in the form of directed acyclic graph. The parallel-computation is then performed in accordance with a sequence that is defined by a topological ordering in the directed acyclic graph. Technologies herein may be applied to computing and mobile applications.

Figure 1:
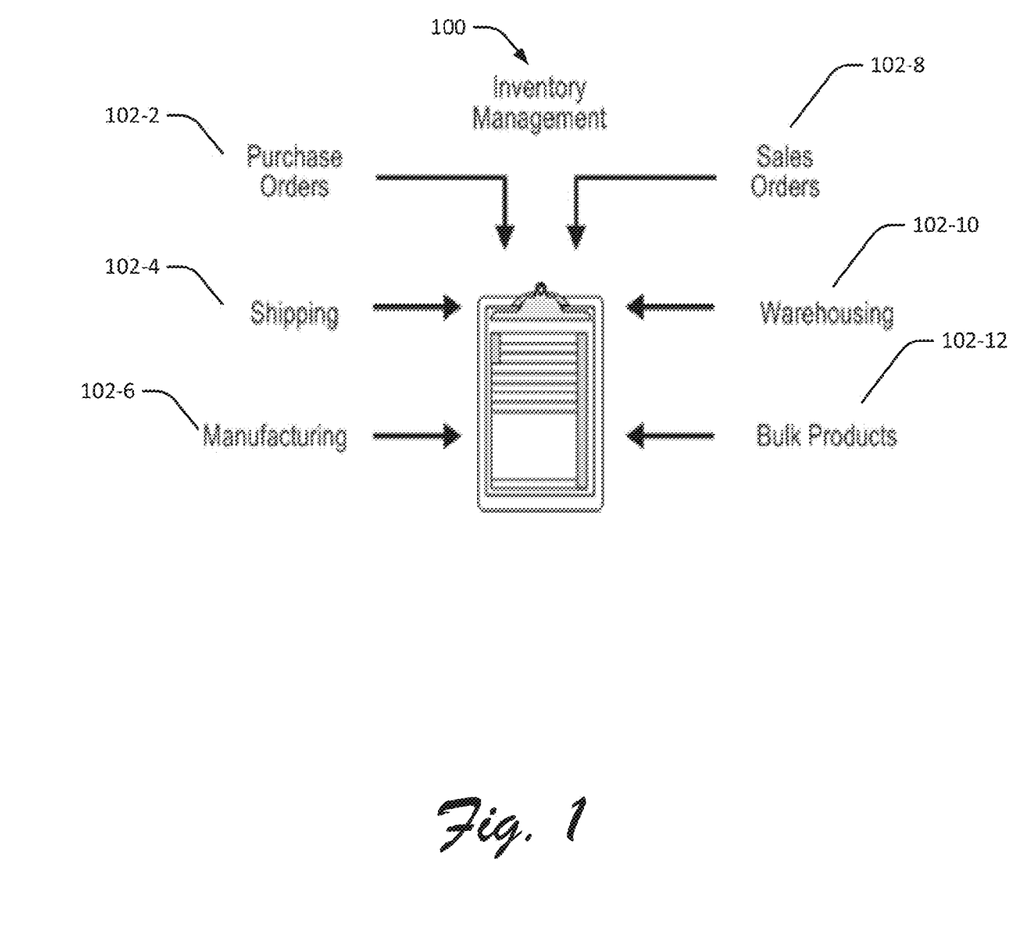
FIG. 1 illustrates an exemplary inventory management that is a subject of the implementations described herein.

FIG. 1 shows an example inventory management 100 that may be a subject of the implementations described herein. As shown, the inventory management 100 may have different variables on its datasheet. For example, the different variables may contain amounts of a purchase order 102-2, shipping 102-4, manufacturing 102-6, sales orders 102-8, warehousing 102-10 and bulk products 102-12.

Although the inventory management 100 illustrates a relatively small number of variables on its datasheet, relations between the variables and relations between itemized contents (not shown) of the variables may increase the complexity of itemized calculations.

Figure 2:
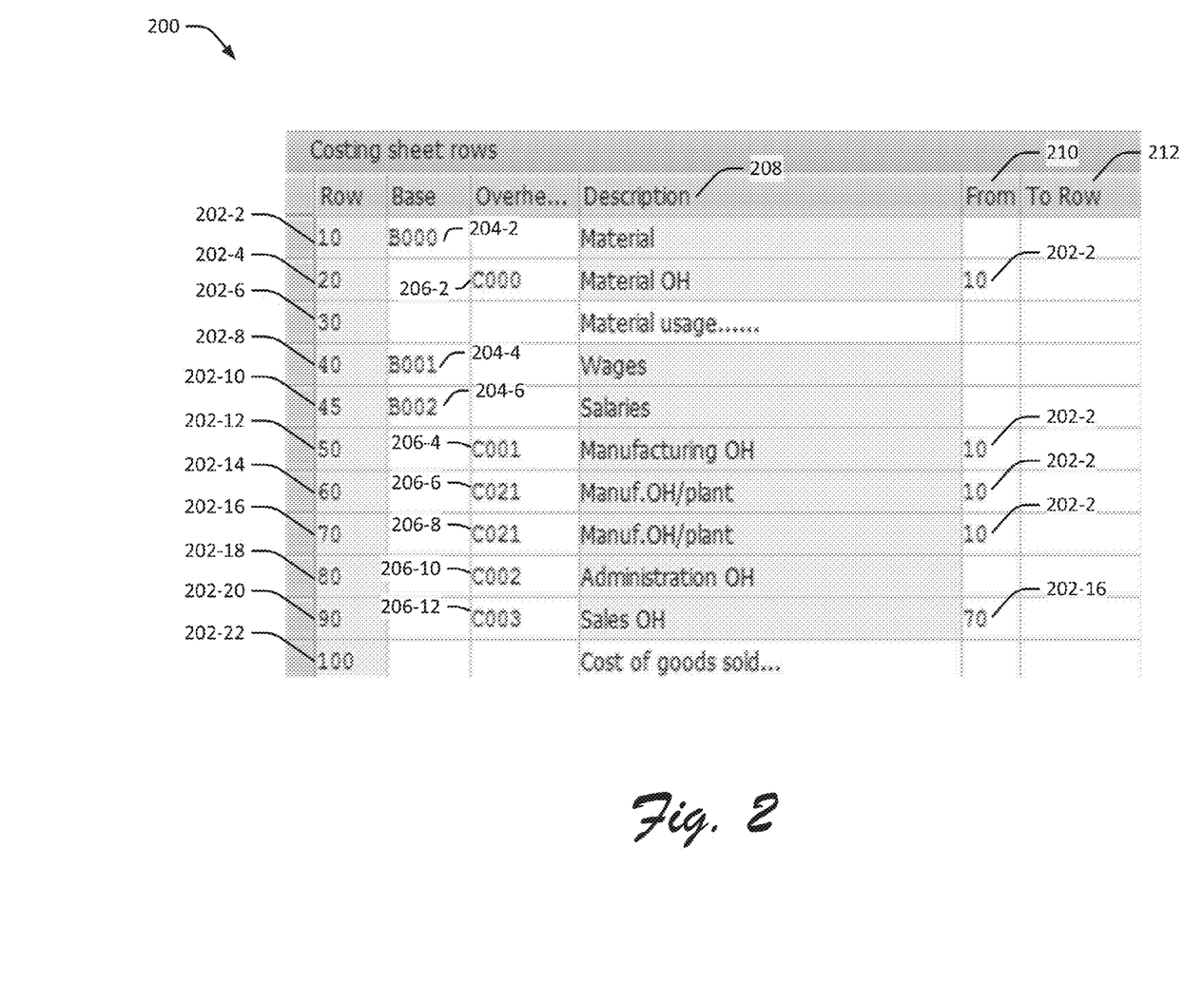
FIG. 2 illustrates an exemplary costing sheet used in accordance with the technology described herein.

FIG. 2 shows an example production order costing sheet 200 that has different variables to calculate an overhead cost per production order. The costing sheet 200, for example, has rows 202, base rows 204, overhead rate rows 206, description 208, start-pointer row 210 and end-pointer row 212.

To illustrate a one rule by one rule calculation of the overhead cost per production order, the calculation logic may perform different processing for different row types on each row.

For example, for rows 202-2 to 202-6, the row 202-6 (i.e., material usage) utilizes the variables base row 204-2 and the overhead rate 206-2. The base row 204-2, for example, corresponds to a direct cost from a production order. The direct cost may be a sum or a total of one or more cost elements.

The overhead rate 206-2, for example, may be a percentage of the row 202-2. In this example, the overhead rate 206-2 has a range that is defined by the start-pointer row 210 and end-pointer row 212. As shown in the example costing sheet 200, the range of the overhead rate 206-2 includes the row 202-2 alone. To this end, the calculation of the material usage—row 202-6 is based on the overhead rate 206-2, which is further based upon the defined range row 202-2.

In another example, the calculation of the row 202-22 (i.e., cost of goods sold) utilizes the variables of the row 202-2 and the rows 202-8 to 202-20.

The base rows 204-4 and 204-6, for example, are amounts of wages and salaries, respectively. The base rows 204-4 and 204-6 may be derived directly from the production orders. In other words, the base rows 204-4 and 204-6 may be considered as independent variables.

On the other hand, the overhead rates 206-4 to 206-8, for example, are manufacturing overheads that are defined by the same range. For example, as shown, the calculation of the overhead rates 206-4 to 206-8 utilizes the range row 202-12 alone. As opposed to the overhead rate 206-12, the range is defined by the range row 202-16. The row 202-16 further depends upon the row 202-2 and as such, the calculation of the overhead rate 206-12 is now treated as multi-layered calculation. In other words, the overhead rate 206-12 is based on row 202-16, which is further based upon the row 202-2.

For a total row calculation, the sum of the row 202-6 and the row 202-22 may be summed up to arrive at the final result.

As further described below, the one rule by one rule calculation has a time complexity (e.g., Big O notation) of O (N*R), where N is a number of production orders, R is number of rows, and O characterizes, for example, processing time in relation to changes in input size.

Although the costing sheet 200 is illustrated as overhead cost calculation, the principle described herein may apply to different other group of calculation logics that need to process a set of data sequentially with embedded loops.

Figure 3:
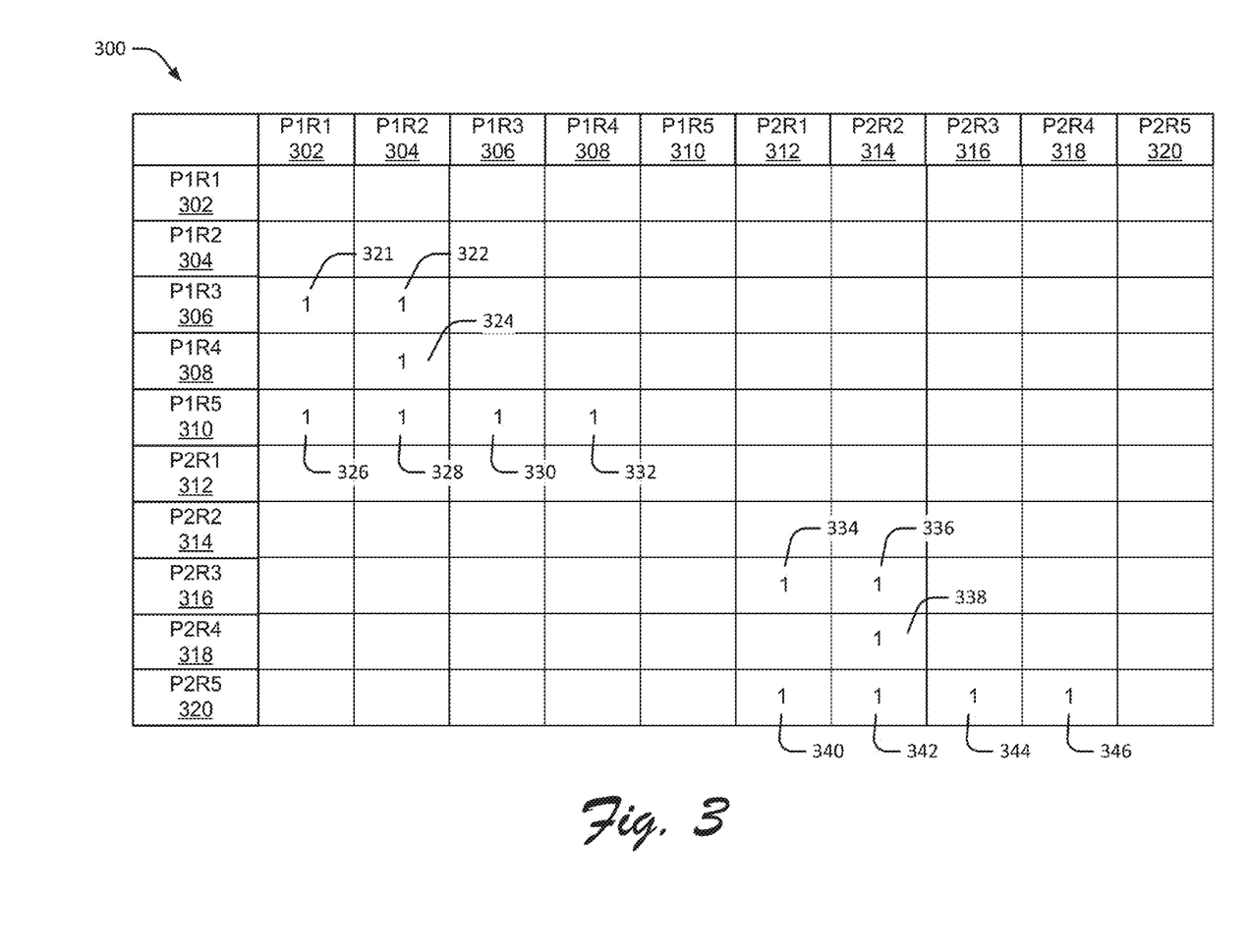
FIG. 3 illustrates an exemplary directed acyclic graph.

FIG. 3 shows an example directed acyclic graph 300 as described in the present implementations herein. The acyclic graph 300, for example, may represent a converted costing sheet 200 after the characteristics of the costing sheet 200 have been identified such as in FIG. 2 above. As shown, the example directed acyclic graph 300 includes nodes P1R1 302, P1R2 304, P1R3 306, P1R4 308, P1R5 310, P2R1 312, P2R2 314, P2R3 316, P2R4 318 and P2R5 320 where P1 and P2 represent production orders while R1, R2, R3, R4 and R5 represent different rules.

Suppose we have "N" production orders and the costing sheet 200 has "R" rules, then an imperative execution in the costing sheet 200 will have to loop "N*R" times. With the example directed acyclic graph 300, the "N*R" times represent the number of nodes while the dependency between the rules represent the edges. The possible number of edges in this example, following topological ordering feature of direct acyclic graphs, is about "N*R" squared.

For example, with two production orders P1 and P2 and five rules R1 to R5, the total number of nodes in the directed acyclic graph 300 is ten (i.e., 2*5). Furthermore, in this example, the number of possible edges or dependencies for the topological ordering in the directed acyclic graph 300 is about one hundred possible edges (i.e., ten squared).

With continuing reference to the example directed acyclic graph 300, the edges 321 to 346 represent the topological ordering from the nodes in each column to the nodes in each row. For example, the edge 321 represents the node P1R3 306 (i.e., row node) to be dependent from the node P1R1 302 (i.e., column node). In this example, the topological ordering dictates that the column node P1R1 302 is first calculated prior to the calculation of the row node P1R3 306.

In another example, the edge 322 represents the row node P1R3 306 to be further dependent from the column node P1R2 304. In other words, following again the topological ordering feature of the direct acyclic graph, the column node P1R2 304 is first calculated prior to the calculation of the row node P1R3 306. In this example and the preceding example above, the tasks in the nodes P1R1 302 and P1R2 304 may belong in the same layer and are capable of being processed at the same time or calculated in parallel.

In another example still, edge 324 represents the row node P1R4 308 to be dependent from the column node P1R2 304. In other words, following again the topological ordering feature of the directed acyclic graph, the column node P1R2 304 is first calculated prior to the calculation of the row node P1R4 308. Because the row nodes P1R3 306 and P1R4 308 are one depth away from the nodes in the topological ordering, then parallel-processing may be implemented on the row nodes P1R3 306 and P1R4 308. In other words, the row nodes P1R3 306 and P1R4 308 may be treated to belong in the same layer in the directed acyclic graph 300.

As further described below, the nodes and edges of the directed acyclic graph 300 may further be illustrated in circles and unidirectional lines, respectively.

Figure 4:
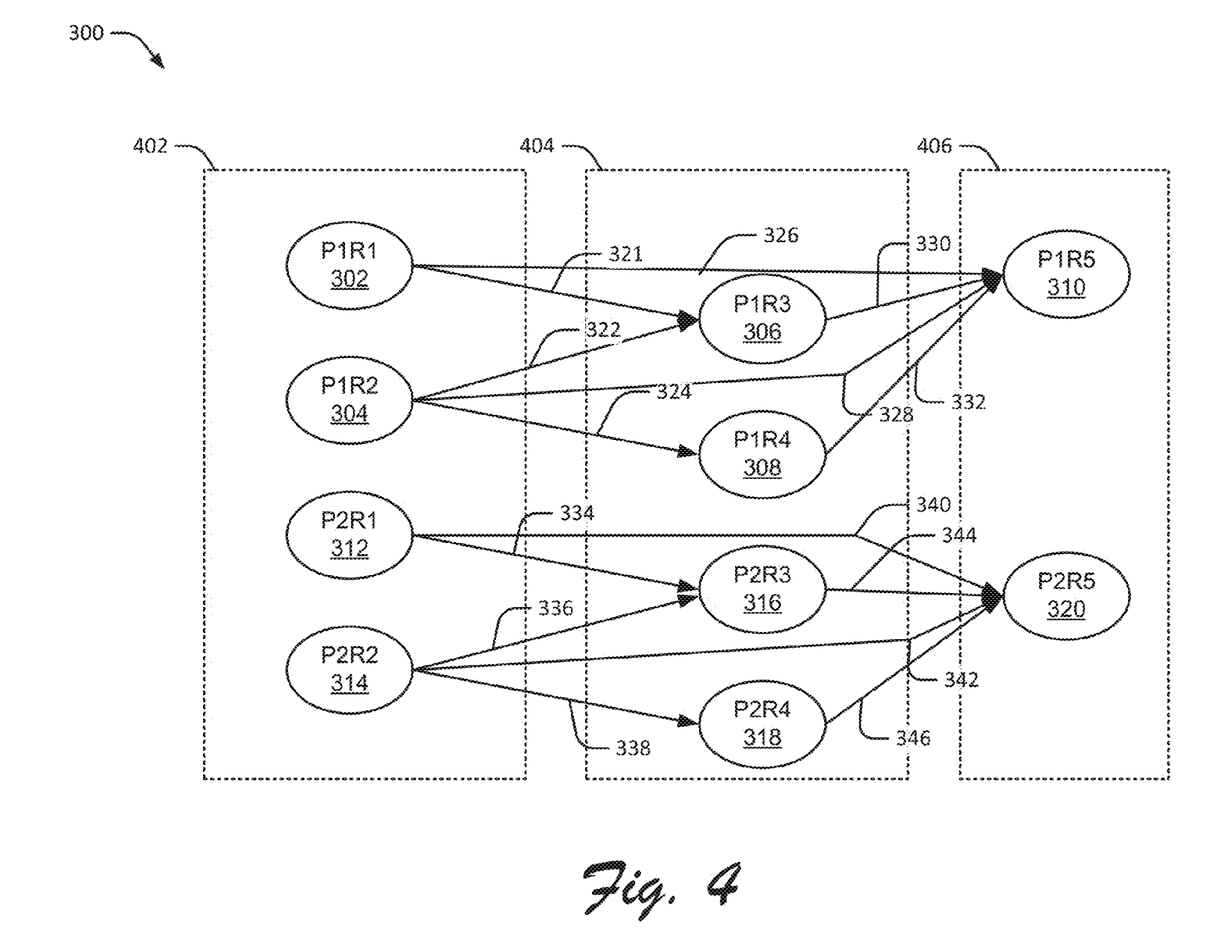
FIG. 4 shows another illustration of directed acyclic graph.

FIG. 4 shows another illustration of the directed acyclic graph 300. Instead of a table-like graph in FIG. 3, FIG. 4 illustrates the nodes and edges of the directed acyclic graph 300 in circles and unidirectional lines, respectively. Furthermore, FIG. 4 shows a first layer 402, a second layer 404, and a third layer 406 for the example directed acyclic graph 300.

In an implementation, a topological sorting algorithm may identify which node or nodes belong to a particular layer. For example, following the directed acyclic graph 300 in FIG. 3, the nodes P1R1 302, P1R2 304, P2R1 312, and P2R2 314 are independent nodes. In other words, these nodes are not dependent upon another node or nodes in the topological ordering of the directed acyclic graph 300. To this end, the nodes P1R1 302, P1R2 304, P2R1 312, and P2R2 314 may belong to the first layer 402. The first layer 402, may be computed through parallel-processing or parallel-calculation.

After the first loop (i.e., first layer 402) is calculated, then the next second loop or second layer 404 is processed. The second layer 404 is defined by the node or nodes that become independent node or nodes after removing the calculated node or nodes from the directed acyclic graph 300.

For example, after calculating in parallel the nodes P1R1 302, P1R2 304, P2R1 312, and P2R2 314 in the first loop above, the nodes P1R3 306, P1R4 308, P2R3 316, and P2R4 318 become independent nodes. These new independent nodes P1R3 306, P1R4 308. P2R3 316, and P2R4 318 define the next layer (i.e., second layer 404) and are processed at the same time or computed in parallel. As opposed to the nodes P1R5 310 and P2R5 320, these two nodes are not independent after the calculation of the first layer 402 above.

Finally, after the first layer 402 and the second layer 404 are calculated, the third layer 406 (i.e., third loop) is defined by the node or nodes that become independent node or nodes after removing the calculated node or nodes from the directed acyclic graph 300.

For example, with the nodes in the first layer 402 and the nodes in the second layer 404 taken out of the picture, the remaining nodes P1R5 310 and P2R5 320 become independent nodes. In this example, the nodes P1R5 310 and P2R5 320 may be processed in parallel or at the same time.

As FIG. 4 illustrates, the number of loops depends upon depth of dependency among the variables in the costing sheet 200. In this case, the depth of dependency totals three loops as opposed to having the "N*R" number of loops in FIG. 2 above. Similarly, using the Big O Notation to find the time complexity, FIG. 4 demonstrates the time complexity of O*D where D is the depth of the rule dependency.

Figure 5:
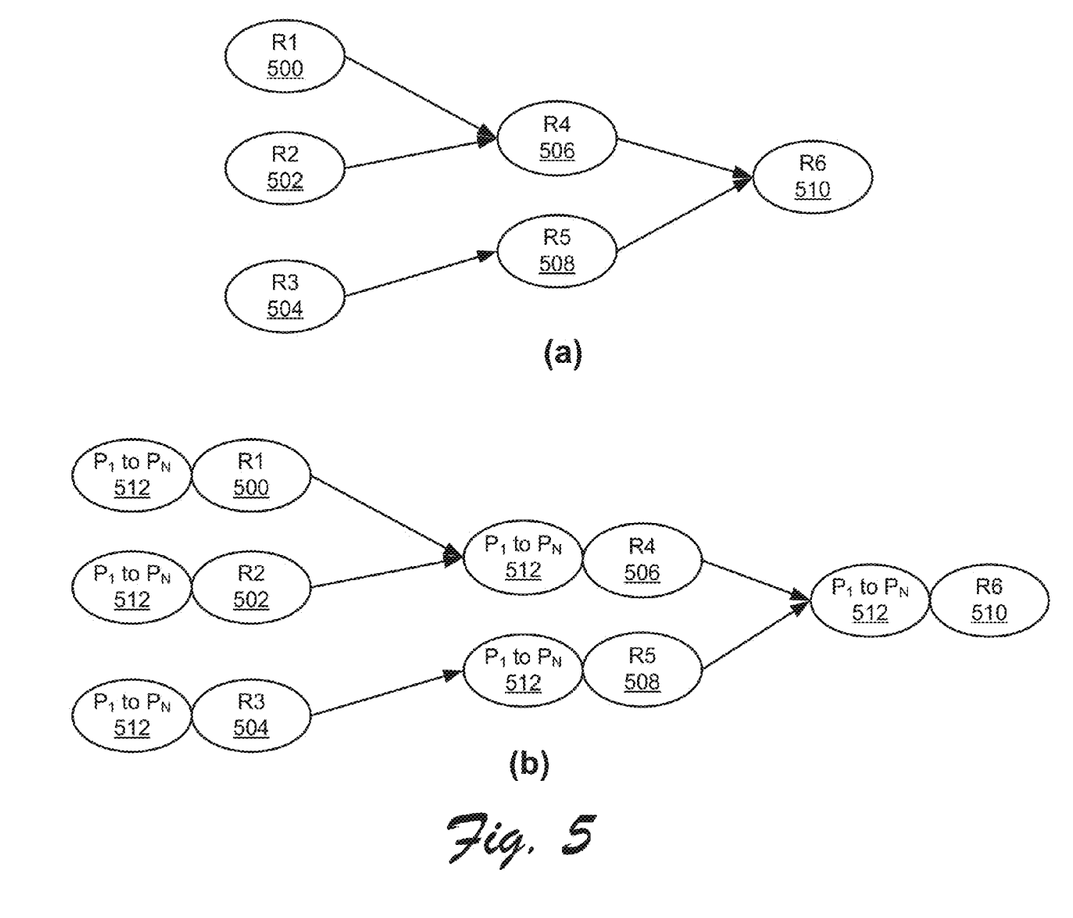
FIG. 5 illustrates internal and external parallelisms of directed acyclic graph.

FIG. 5 illustrates the internal and external parallelism of a directed acyclic graph.

For example, in a costing sheet with N production orders and R number of costing rules, an internal parallelism may be generated after deriving the directed acyclic graph of the costing sheet. The internal parallelism, for example, may focus on the costing rules that are independent rules at the start of the loop or after a certain loop has been calculated in parallel.

FIG. 5(*a*) illustrates, for example, rules R1 500, R2 502, and R3 504 to be independent rules based on the directed acyclic graph of the costing sheet. These rules R1 500, R2 502, and R3 504 are independent in the sense that they may be processed right away in parallel and they do not depend upon another rule or rules. Similar to the discussion of FIG.

4, the rules R1 500, R2 502, and R3 504 may be treated as the first layer or the first loop.

After the first layer or first loop (i.e., rules R1 500, R2 502, and R3 504) is processed in parallel and the first layer or first loop is taken out of the picture of FIG. 5(*a*), then the rules R4 506 and R5 508 become independent rules. In other words, the second loop for the parallel calculation may involve the processing of the rules R4 506 and R5 508. After the calculation of the rules R4 506 and R5 508, then the last rule R6 510 remains as the last loop to be calculated in parallel.

FIG. 5(*b*) further demonstrates the external parallelism of a costing sheet such as, for example, the costing sheet 200. As shown, the costing rules R1 500 to R6 510 depend in common upon all of the production orders "$P_1$ to $P_N$" 512. To this end, the external parallelism illustrates that parallel-calculation for each layer or loop may include the processing of the "$P_1$ to $P_N$" 512 as well.

Figure 6:
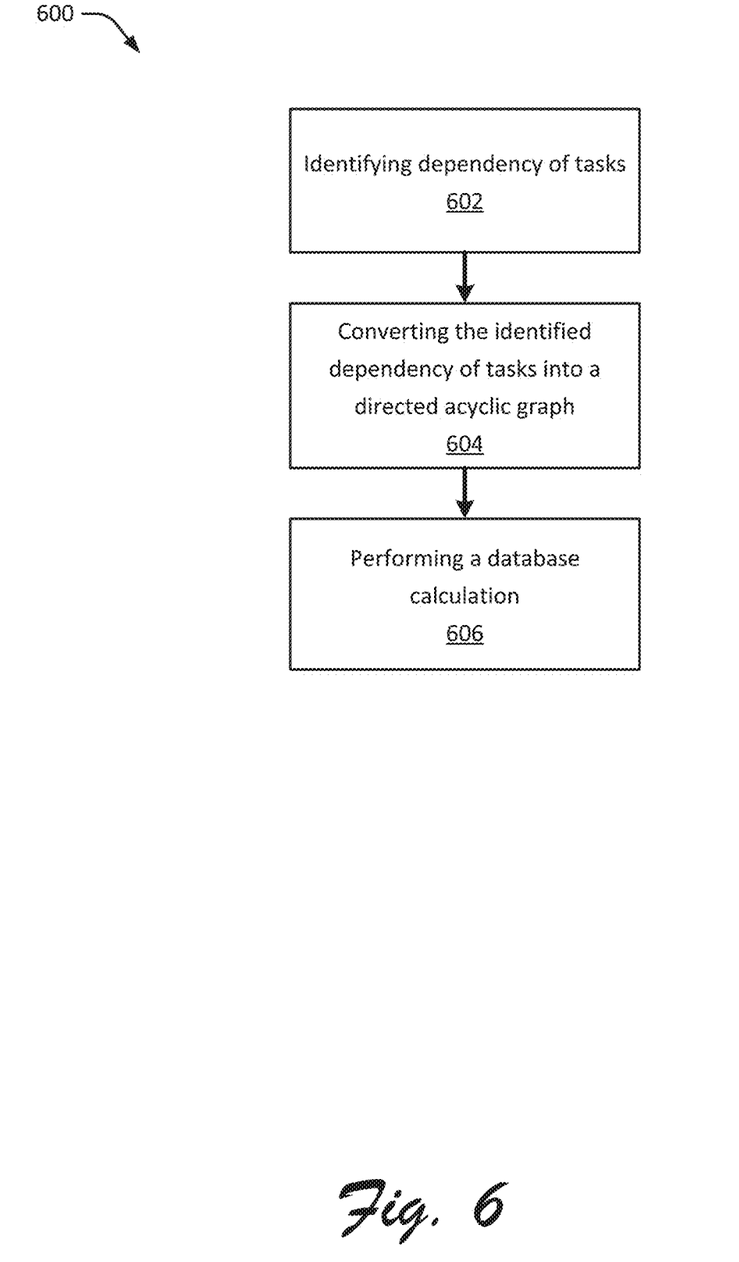
FIG. 6 illustrates an exemplary process used in accordance with the technology described herein.

FIG. 6 illustrates an exemplary process 600 for implementing, at least in part, the technology described herein. In particular, process 600 depicts an overview flow of implementing database calculation. For example, the database calculation facilitates high performance overhead cost calculation using a set oriented parallel-calculation of tasks. The process 600 may be performed by a computing device or devices. An example architecture of such a computer device is described below with reference to FIG. 8. In this particular example, the process 600 describes that certain acts are to be performed at or by a user or a system.

At 602, identifying dependency of tasks is performed. For example, for rows 202-2 to 202-6 of the costing sheet 200, the row 202-6 (i.e., material usage) utilizes the variables base row 204-2 and the overhead rate 206-2. The base row 204-2, for example, corresponds to a direct cost from a production order while the overhead rate 206-2, for example, may be a percentage of the row 202-2.

At 604, the identified dependency of tasks into is converted into a directed acyclic graph. For example, the identified dependency of tasks is represented in a topological order. That is, a task in one node may be utilized as a dependent of another node but not symmetrically. The directed acyclic graph (e.g., directed acyclic graph 300) may facilitate the identification of the tasks by its depth of dependency.

At 606, a database calculation is performed. For example, the directed acyclic graph 300 is divided by layers (e.g., first layer 402, second layer 404, etc.) and each layer may be calculated in parallel. As an example, the database calculation may be implemented, by SAP High Performance Analytic Appliance (SAP HANA) software that utilizes an in-memory, column oriented, relational database management.

Figure 7:
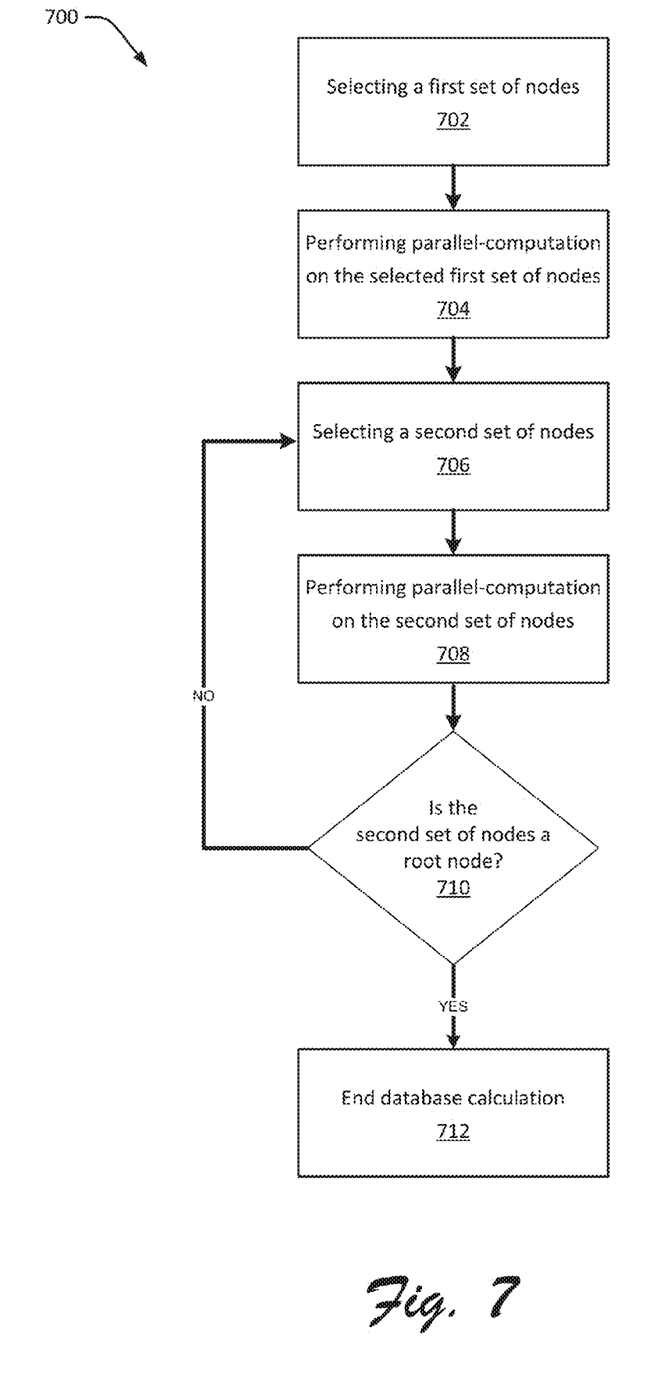
FIG. 7 illustrates an exemplary process used in accordance with the technology described herein.

FIG. 7 illustrates an exemplary process 700 for implementing, at least in part, the technology described herein. In particular, process 700 depicts a flow to implement the database calculation and particularly, the use of parallel-computations for each set of operations. For example, a high performance overhead cost calculation is achieved through imperative parallel-computations for each layer in the directed acyclic graph. The process 700 may be performed by a computing device or devices. An example architecture of such a computer device is described below with reference to FIG. 8. In this particular example, the process 700 describes that certain acts are to be performed at or by a user or a system.

At 702, a first set of nodes is selected. For example, the first set of nodes are the node or nodes at outermost vertices (i.e., first layer 402) of the directed acyclic graph 300. In this example, the first set of nodes are independent nodes.

For example, as illustrated in FIG. 4, the nodes P1R1 302, P1R2 304, P2R1 312, and P2R2 314 are independent nodes and are treated as the first set of nodes.

At 704, parallel-computation on the selected first set of nodes is performed. For example, referring again to the first layer 402 of FIG. 4, the nodes P1R1 302, P1R2 304, P2R1 312, and P2R2 314 are independent nodes and are processed at the same time or in parallel by the computing device.

At 706, a second set of nodes is selected. For example, the second set of nodes are the independent node or nodes after taking out the calculated first set of nodes from the directed acyclic graph 300. In this example, the second set of nodes are independent by themselves.

For example, as shown in FIG. 4, the second set of nodes are the node or nodes at the next loop (i.e., second layer 404) after the calculated first layer 402 is taken out of the picture of the directed acyclic graph 300. In this example, the second set of nodes includes the nodes P1R3 306, P1R4 308, P2R3 316, and P2R4 318.

At 708, parallel-computation on the second set of nodes is performed. The second set of nodes may refer to independent node or nodes in a subsequent layer after the preceding layer has been calculated. For example, after the second set of nodes is calculated and as a result, another set of node or nodes become independent node or nodes, then the new independent node or nodes are treated as the second set of nodes.

At 710, a determination is performed to determine if the second set of nodes is a root node. The root node, for example, is the last independent node or nodes in the directed acyclic graph 300.

If the second set of nodes is a root node, following the "YES" branch of 710, at 712, the database calculation is ended. If the next set of nodes is not the root node, then following the "NO" branch of 710, 706 is performed. As discussed in block 708, the second set of nodes may refer to the node or nodes that become independent as a result of the calculation of the previous second set of nodes.

Figure 8:
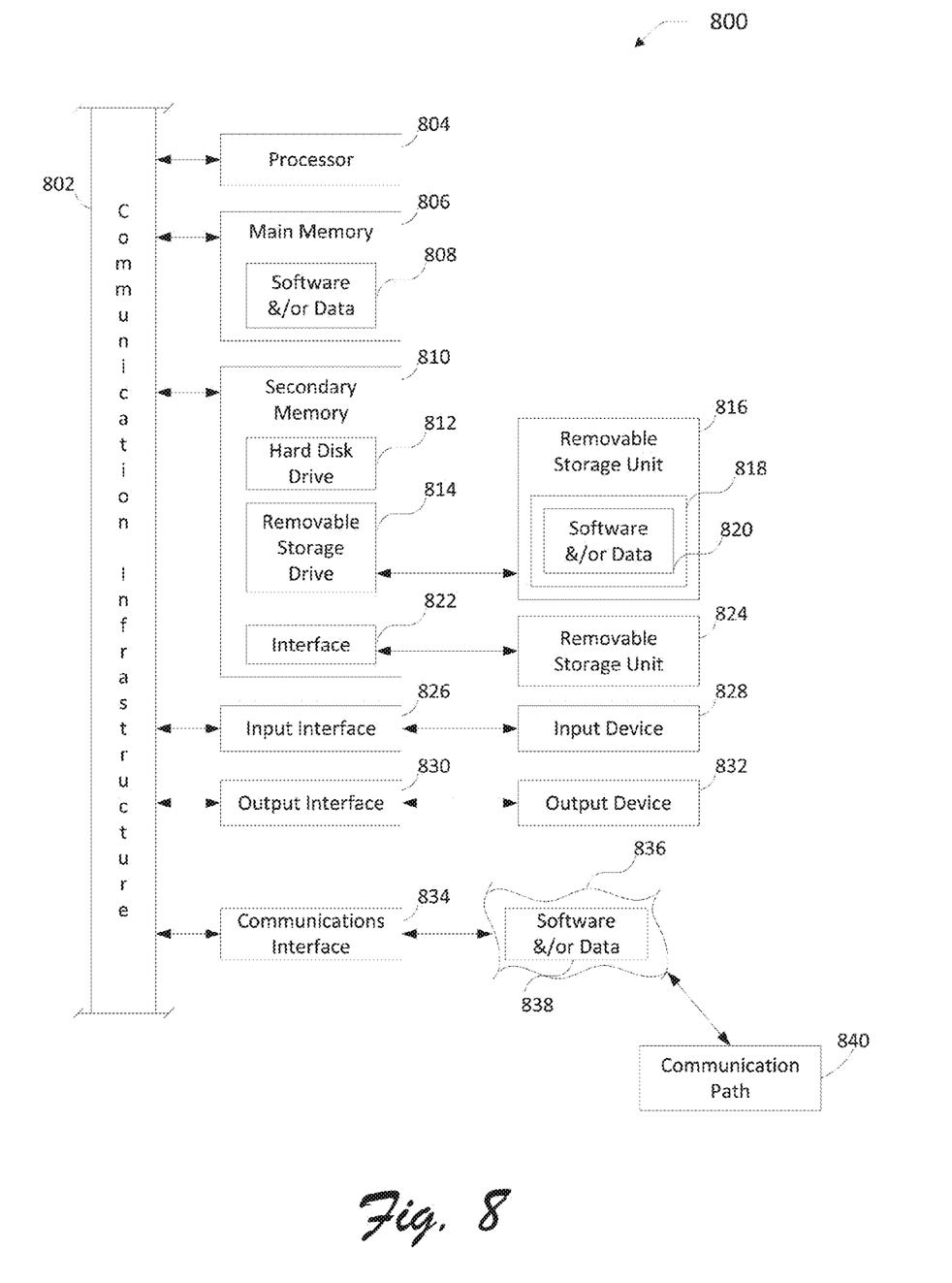
FIG. 8 illustrates an exemplary computing system to implement in accordance with the technologies described herein.

FIG. 8 illustrates an exemplary system 800 that may implement, at least in part, the technologies described herein. The computer system 800 includes one or more processors, such as processor 804. Processor 804 can be a special-purpose processor or a general-purpose processor. Processor 804 is connected to a communication infrastructure 802 (for example, a bus or a network). Depending upon the context, the computer system 800 may also be called a client device.

Computer system 800 also includes a main memory 806, preferably Random Access Memory (RAM), containing possibly inter alia computer software and/or data 808.

Computer system 800 may also include a secondary memory 810. Secondary memory 810 may include, for example, a hard disk drive 812, a removable storage drive 814, a memory stick, etc. A removable storage drive 814 may comprise a floppy disk drive, a magnetic tape drive, an optical disk drive, a flash memory, or the like. A removable storage drive 814 reads from and/or writes to a removable storage unit 816 in a well-known manner. A removable storage unit 816 may comprise a floppy disk, a magnetic tape, an optical disk, etc. which is read by and written to by removable storage drive 814. As will be appreciated by persons skilled in the relevant art(s) removable storage unit 816 includes a computer usable storage medium 818 having stored therein possibly inter alia computer software and/or data 820.

In alternative implementations, secondary memory 810 may include other similar means for allowing computer programs or other instructions to be loaded into computer system 800. Such means may include, for example, a removable storage unit 824 and an interface 822. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 824 and interfaces 822 which allow software and data to be transferred from the removable storage unit 824 to computer system 800.

Computer system 800 may also include an input interface 826 and a range of input devices 828 such as, possibly inter alia, a keyboard, a mouse, etc.

Computer system 800 may also include an output interface 830 and a range of output devices 832 such as, possibly inter alia, a display, one or more speakers, etc.

Computer system 800 may also include a communications interface 834. Communications interface 834 allows software and/or data 838 to be transferred between computer system 800 and external devices. Communications interface 834 may include a modem, a network interface (such as an Ethernet card), a communications port, a Personal Computer Memory Card International Association (PCMCIA) slot and card, or the like. Software and/or data 838 transferred via communications interface 834 are in the form of signals which may be electronic, electromagnetic, optical, or other signals capable of being received by communications 834. These signals 836 are provided to communications interface 834 via a communications path 840. Communications path 840 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 816, removable storage unit 824, and a hard disk installed in hard disk drive 812. Computer program medium and computer usable medium can also refer to memories, such as main memory 806 and secondary memory 810, which can be memory semiconductors (e.g. Dynamic Random Access Memory (DRAM) elements, etc.). These computer program products are means for providing software to computer system 800.

Computer programs (also called computer control logic) are stored in main memory 806 and/or secondary memory 810. Such computer programs, when executed, enable computer system 800 to implement the present technology described herein. In particular, the computer programs, when executed, enable processor 804 to implement the processes of aspects of the above. Accordingly, such computer programs represent controllers of the computer system 800. Where the technology described herein is implemented, at least in part, using software, the software may be stored in a computer program product and loaded into computer system 800 using removable storage drive 814, interface 822, hard disk drive 812 or communications interface 834.

The technology described herein may be implemented as computer program products comprising software stored on any computer useable medium. Such software, when executed in one or more data processing devices, causes data processing device(s) to operate as described herein. Embodiments of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A method of database calculation, the method comprising:
identifying dependency of tasks;
converting the identified dependency of tasks into a directed acyclic graph in response to the identified dependency of tasks, wherein the directed acyclic graph topologically orders the tasks into layers of tasks; and
performing the database calculation, wherein the database calculation computes in parallel the tasks in each layer of the layers of tasks, wherein the performing the database calculation further comprises selecting a first set of nodes in a topological ordering of the directed acyclic graph, performing parallel-computation of the tasks in the selected first set of nodes, selecting a second set of nodes, performing parallel computation of the tasks in the selected second set of nodes, and determining if the selected second set of nodes is a root node, wherein in response to a finding of the root node, the parallel-computation of the tasks ends, otherwise, the selecting of another second set of nodes is performed.

2. The method according to claim 1, wherein the other second set of nodes are the node or nodes that become independent after the parallel-computation of the preceding second set of nodes.

3. The method according to claim 1, wherein the first set of nodes are the node or nodes in outermost vertices of the directed acyclic graph.

4. The method according to claim 1, wherein the root node is the node or nodes at an end of the topological ordering of the directed acyclic graph.

5. The method according to claim 1, wherein the performing the database calculation has a number of loops that is defined by a depth of dependency in the identified dependency of tasks.

6. The method according to claim 1, wherein the identified tasks in a first layer of the layers of tasks are independent tasks.

7. The method according to claim 1, wherein the identified tasks are grouped into nodes in each layer of the layers of tasks.

8. The method according to claim 1, wherein each layer in the layers of tasks is separated by a depth of dependency.

9. The method according to claim 1, wherein the parallel-computation of a first layer in the layers of tasks transforms a second layer to become an independent layer.

10. The method according to claim 1, wherein the directed acyclic graph utilizes an internal parallelism and an external parallelism of the identified tasks.

11. One or more computer-readable media storing processor-executable instructions that when executed cause one or more processors to perform operations that facilitate calculation logic comprising:
identifying dependency of tasks;
converting the identified dependency of tasks into a directed acyclic graph in response to the identified dependency of tasks, wherein the directed acyclic graph topologically orders the identified tasks into layers of tasks; and
performing a database calculation, wherein the database calculation utilizes parallel-computation of the tasks in each layer of the layers of tasks, wherein the performing the database calculation further comprises selecting a first set of nodes in a topological ordering of the directed acyclic graph, performing parallel-computation of the tasks in the selected first set of nodes, selecting a second set of nodes, performing parallel computation of the tasks in the selected second set of nodes, and determining if the selected second set of nodes is a root node, wherein in response to a finding of the root node, the parallel-computation of the tasks ends, otherwise, the selecting of another second set of nodes is performed.

12. The one or more computer-readable media according to claim 11, wherein the other second set of nodes are the node or nodes that become independent after the parallel-computation of the preceding second set of nodes.

13. The one or more computer-readable media according to claim 11, wherein the first set of nodes are the node or nodes in an outermost vertices of the directed acyclic graph, wherein the outermost vertices are independent of another node or nodes.

14. The one or more computer-readable media according to claim 11, wherein the root node is the node or nodes at an end of the topological ordering of the directed acyclic graph.

15. The one or more computer-readable media according to claim 11, wherein the performing the database calculation has a number of loops that is defined by a depth of dependency in the identified dependency of tasks.

16. The one or more computer-readable media according to claim 11, wherein the identified tasks in a first layer of the layers of tasks are independent tasks.

17. The one or more computer-readable media according to claim 11, wherein the identified tasks are grouped into nodes in each layer of the layers of tasks.

18. The one or more computer-readable media according to claim 11, wherein each layer in the layers of tasks is separated by a depth of dependency.

19. A system that facilities calculation logic, the system comprising:
one or more processors that are configured to perform:
identifying dependency of tasks;
converting the identified dependency of tasks into a directed acyclic graph in response to the identified dependency of tasks, wherein the directed acyclic graph topologically orders the identified tasks into layers of tasks;
performing a database calculation, wherein the database calculation utilizes parallel-computation of the tasks in each layer of the layers of tasks, wherein the performing the database calculation further comprises selecting a first set of nodes in a topological ordering of the directed acyclic graph, performing parallel-computation of the tasks in the selected first set of nodes, selecting a second set of nodes, performing parallel computation of the tasks in the selected second set of nodes, and determining if the selected second set of nodes is a root node, wherein in response to a finding of the root node, the parallel-computation of the tasks ends, otherwise, the selecting of another second set of nodes is performed; and an output interface configured to the one or more processors, that provides results of the database calculation.

20. The system according to claim 19, wherein the other second set of nodes are the node or nodes that become independent after the parallel-computation of the preceding second set of nodes.

* * * * *